United States Patent Office 3,594,385
Patented July 20, 1971

3,594,385
SYNTHESIS OF NEW NF COMPOUNDS
Thomas Harland Brownlee, Westport, Conn., assignor to American Cyanamid Company, Stamford, Conn.
No Drawing. Continuation-in-part of abandoned application Ser. No. 578,420, Sept. 2, 1966. This application Aug. 2, 1967, Ser. No. 660,870
Int. Cl. C07d 29/26, 31/42, 27/00
U.S. Cl. 260—290    2 Claims

ABSTRACT OF THE DISCLOSURE

A novel process for the production of NF compounds which comprises reacting a conjugated diene with a compound having the formula (I)           $F_2N—R^6$ wherein $R^6$ is (1) a C≡N, (2) a  or (3) a $\underset{F}{\overset{\shortmid}{C}}=NF$ radical is disclosed as are the novel compounds produced thereby.

CROSS-REFERENCE TO RELATED APPLICATIONS

This application is a continuation-in-part of my copending application, Ser. No. 578,420, filed Sept. 2, 1966, now abandoned.

The starting materials represented by Formula I, above, as well as methods for their production, are disclosed in copending U.S. application, Ser. No. 280,492, filed May 9, 1963, by Firth et al.

BACKGROUND OF THE INVENTION

The search for compounds having a high nitrogen and fluorine content has been, in recent years, greatly intensified. Compounds of this type have found use as components in high energy rocket fuels and, for this reason, have become important.

SUMMARY OF THE INVENTION

I have now discovered a novel group of compounds which have a high nitrogen and fluorine content and are therefore useful in the fields specified above. Furthermore, although they are usually liquids, they may be easily converted to solid oxidizers by known methods.

DESCRIPTION OF THE INVENTION INCLUDING PREFERRED EMBODIMENTS

As mentioned above, the novel compounds claimed herein are prepared by reacting a conjugated diene, such as butadiene, with a compound represented by Formula I. My novel compounds are represented by the formulae

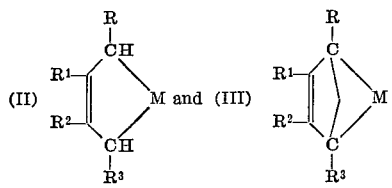

wherein R, $R^1$, $R^2$ and $R^3$ are, individually, hydrogen or an alkyl radical and M is a

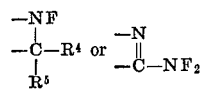

radical wherein $R_4$ and $R_5$ are, individually, $NF_2$ or F radicals.

Examples of compounds represented by Formula II and III include

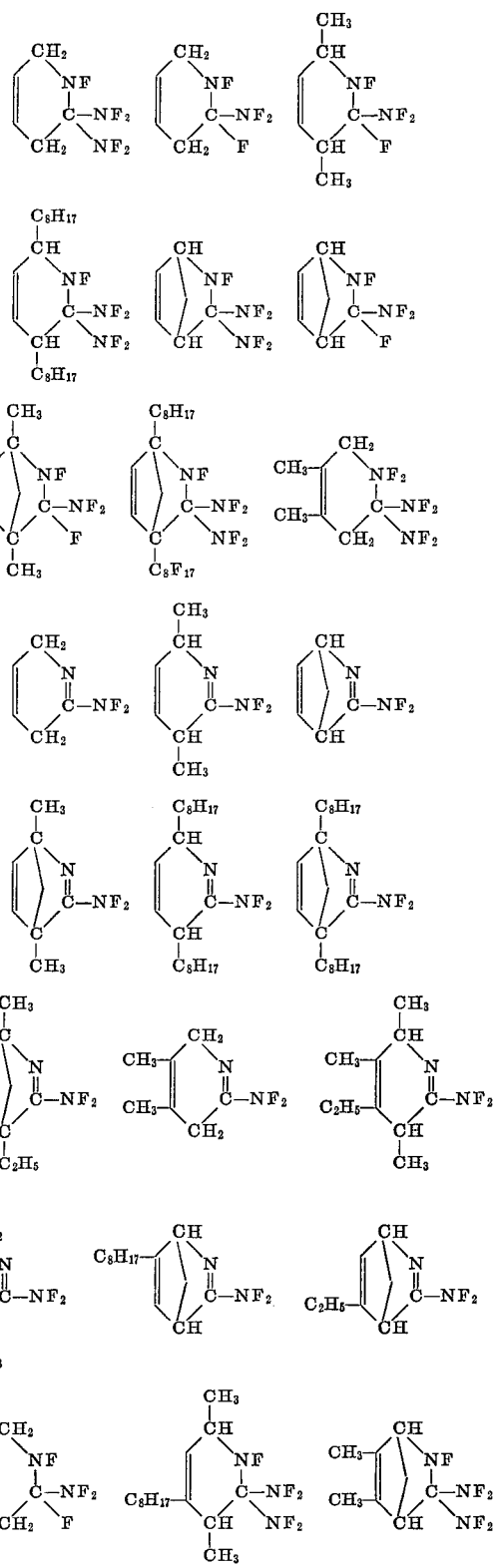

and the like.

The products of Formulae II and III are produced by reacting the diene and Formula I compound, in the liquid or vapor phase, i.e. the reactants are mixed together at a temperature such that the resultant mixture is a liquid or a gas. Once the mixture is formed, it is allowed to warm to about 0° C. or higher. The compounds then react in from about 15 minutes to 7 days depending upon the temperature to which the mixture is warmed, i.e. the lower the temperature, the longer the reaction time.

The reaction is conducted in a sealed reaction vessel and in the absence of oxygen or moisture. Although subatmospheric or atmospheric pressures are tolerable, it is preferred to conduct the reaction under a slight pressure.

Examples of suitable compounds represented by Formula I include difluorocyanamide, perfluoroguanidine and perfluoroformamidine.

Examples of suitable conjugated dienes which may be used, include butadiene, isoprene, 1,3-cyclohexane, cyclopentadiene, alkylated butadienes, i.e. 2,3-dimethylbutadiene, 2,3-dioctylbutadiene and the like.

The following examples are set forth for purposes of illustration only and are not to be construed as limitations on the instant invention. All parts and percentages are by weight unless otherwise specified.

EXAMPLE 1

Equimolar amounts of perfluoroguanidine and cyclopentadiene are condensed together at −196° C. into a suitable sealed reaction vessel which has been purged with nitrogen. The resultant liquid mixture is allowed to remain under autogenous pressure at 25° C. for 2 hours. The resultant product has the formula

and has the following properties; 1 mm. vapor pressure at 25° C., I.R. absorptions at: 7.6, 10.2, 10.4, 11.1, 11.4, 12.6, 13.4μ and others F$^{19}$ NHR: −33.9, −32.5, −30.5, −18.5, and +78.9 p.p.m. (CFl$_3$ int. std.).

*Analysis.*—Calc'd for $C_6H_6N_3F_5$ (percent): F, 44.2; N, 19.5. Found (percent): F, 43.1; N, 22.5.

Following the procedure of Example 1, various other conjugated dienes are reacted with compounds of Formula I. The results are set forth in Table I, below.

TABLE I

| Ex. | Diene | Formula I compound | Product | Properties |
|---|---|---|---|---|
| 2 | Cyclopentadiene | Perfluoroformamidine | (structure: N—F, C—F, NF$_2$) | Brown liquid, infrared and fluorine and proton NMR consistant with assigned structure. |
| 3 | 2,3-dimethylbutadiene | Difluorocyanamide | (structure: CH$_3$-, CH$_3$-, N, C, NF$_2$) | Liquid. |
| 4 | Isoprene | Perfluoroguanidine | (structure: N—F, CH$_3$-, C—NF$_2$, NF$_2$) | Do. |
| 5 | 1,3-butadiene | do. | (structure: N—F, C—NF$_2$, NF$_2$) | Do. |
| 6 | do. | Perfluoroformamidine | (structure: N—F, C—NF$_2$, F) | Do. |
| 7 | Cyclopentadiene | Difluorocyanamide | (structure: N, C—NF$_2$) | Clear liquid, B.P. 50-70° C./1m m. pressure; H'NMR(τ): 3.08, 4.77, 5.96, 7.75; F$^{19}$ NMR: −44.9 p.p.m. (CFCl$_3$ int. std.). |
| 8 | 1,3-butadiene | do. | (structure: N, C—NF$_2$) | Oily liquid. |
| 9 | 2,3-dimethylbutadiene | Perfluoroguanidine | (structure: N—F, C—NF$_2$, NF$_2$) | Clear liquid, H'NMR (τ): 5.77, 6.07, 7.09, 8.32; F$^{19}$ NMR: −26.3, +63.4 p.p.m. (CFCl$_3$ int. std.). |

The novel compounds of the instant invention can, as mentioned above, be utilized as components in rocket propellant compositions in accordance with general procedures, well known to those skilled in the art. Conventional oxidizers such as nitric acid, oxygen, ammonium perchlorate, potassium perchlorate, sodium perchlorate, ammonium nitrate, etc. may be utilized in conjunction with the novel oxidizers disclosed herein. One would generally utilize from about 1% to about 35% of my novel compounds in the composition along with an artificial binder such as polybutadiene-carboxylic acids, nitrocellulose, polyesters, polyurethanes and the like, in amounts of from about 20–40% by weight. Additionally, one can add such fuels as aluminum, beryllium, boron, etc. to the propellant compositions. Further details concerning the production and formulation of such rocket propellant compositions can be found in one or more of the following U.S. patents which are hereby incorporated herein by reference: U.S. 2,622,277; 2,646,596; 3,132,978.

EXAMPLE 10

To a suitable mixing vessel are added 29.5% of ammonium perchlorate, 26.3% of powdered aluminum, 34.2% of a commercially available polyester binder resin (mixed with sufficient cross-linking agent) and 10.0% of the compound of Example 1. After heating at 70° C. for 96 hours to cross-link the resin, a tough, propellant composition is recovered.

EXAMPLES 11–18

Following the procedure of Example 10, the products of Examples 2–9 were incorporated into rocket propellant compositions in place of the Example 1 product used therein. In each instance, tough, stable products were obtained.

I claim:

1. A compound represented by a formula selected from the group consisting of (1)

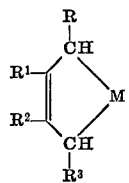

and (2)

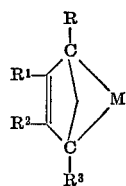

wherein R, $R^1$, $R^2$ and $R^3$ are, individually, selected from the group consisting of hydrogen and an alkyl radical and M is selected from the group consisting of

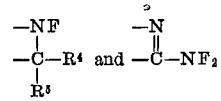

radicals, $R^4$ and $R^5$ being selected from the group consisting of $NF_2$ and F.

2. A method for the production of a compound of claim 1 which comprises reacting a conjugated diene with a compound having the formula

wherein $R^6$ is selected from the group consisting of

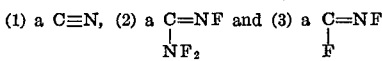

radical.

References Cited

UNITED STATES PATENTS 3,215,709   11/1965   Logothetis _____ 260—349

OTHER REFERENCES

Mitsch: J. Am. Chem. Soc., vol. 87, pp. 328 to 333 (1965).

LELAND A. SEBASTIAN, Primary Examiner

U.S. Cl. X.R.

149—19, 109; 260—296, 313.1